United States Patent [19]

Francis et al.

[11] Patent Number: 5,192,245
[45] Date of Patent: Mar. 9, 1993

[54] THRESHER ELEMENTS FOR A COMBINE

[75] Inventors: Robert L. Francis, Moline, Ill.; James W. Minnihan, Racine, Wis.

[73] Assignee: Case Corporation, Racine, Wis.

[21] Appl. No.: 756,628

[22] Filed: Sep. 9, 1991

[51] Int. Cl.⁵ ............................................. A01F 12/20
[52] U.S. Cl. ...................... 460/71; 460/110; 460/122
[58] Field of Search ............ 460/71, 72, 110, 121, 460/122

[56] References Cited

U.S. PATENT DOCUMENTS

| 4,889,517 | 12/1989 | Strong et al. | 460/71 X |
| 5,035,675 | 7/1991 | Dunn et al. | 460/62 |

FOREIGN PATENT DOCUMENTS

| 0097988 | 1/1984 | European Pat. Off. | 460/72 |
| 3123992 | 1/1983 | Fed. Rep. of Germany | 460/72 |

Primary Examiner—Terry Lee Melius
Attorney, Agent, or Firm—Dressler, Goldsmith, Shore, Sutker & Milnamow, Ltd.

[57] ABSTRACT

A thresher element adapted for securement to a combine rotor for threshing crop materials. The thresher element has a generally L-shaped configuration including first and second portions which angle away from each other. The second portion of each thresher element is configured to impact with crop materials moving therepast while the first portion deflects crop material from impacting with thresher element mountings on the rotor. The first and second portions of the thresher elements are each provided with a smooth outer material engaging surface extending thereover to inhibit abrading action between the crop material and the thresher elements. The smooth outer material engaging surface extending over the second portion of the thresher element preferably has a curved configuration. A smooth spike can extend outwardly from the second portion of the thresher element to facilitate handling of crop material during the threshing process.

22 Claims, 3 Drawing Sheets

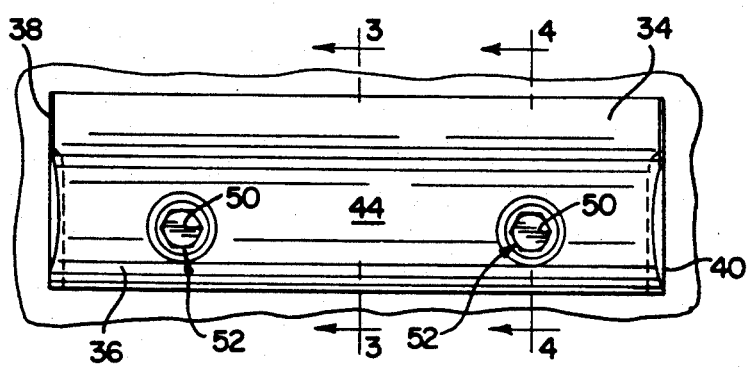
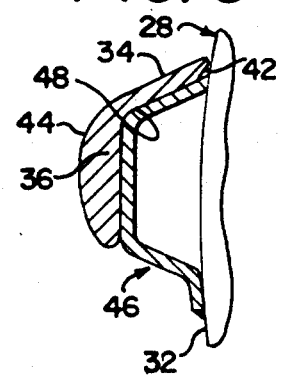
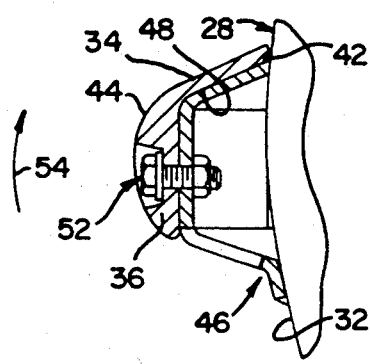
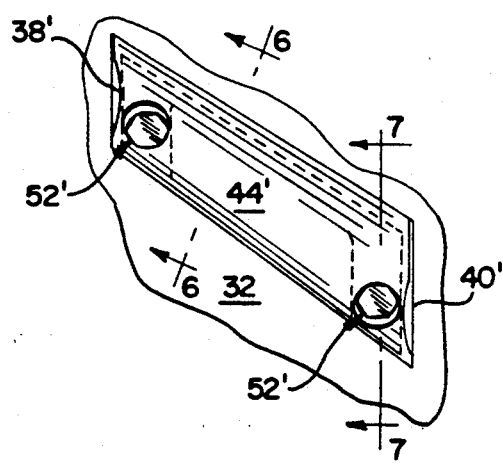
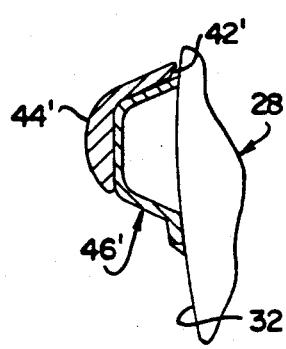
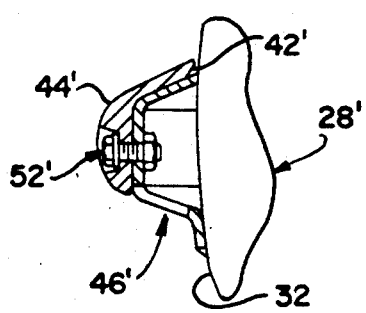

ABGE THRESHER ELEMENTS FOR A COMBINE

FIELD OF THE INVENTION

The present invention generally relates to agricultural combines and, more particularly, to thresher elements to be mounted to a rotor of an agricultural combine and configured to improve quality of grain harvested by the combine.

BACKGROUND OF THE INVENTION

A conventional agricultural combine includes a header assembly for severing and collecting crop materials as the combine is driven through a field and a feeder mechanism for advancing and elevating the crop materials to a threshing area on the combine. In the threshing area of the combine, the crop material is threshed as it passes between a rotor assembly and a stationary generally cylindrical housing.

A typical rotor assembly includes an elongated rotor including a series of metallic thresher elements peripherally arranged thereabout. An outer surface on the thresher elements is arranged proximate to the cylindrical housing. The rotor is mounted on a frame of the combine and is rotatably driven at variable speeds depending on the crop material being harvested. Conventional thresher elements have a rasp or tooth-like configuration on the outer surface which impacts with crop materials as the rotor assembly is driven.

The impact of the crop materials against any of the multitude of edges on the rasp or tooth-like outer surface on the thresher elements naturally tends to cause damage to the crop materials. That is, the impact of the slower moving crop materials against and coupled with the relative movement between the threshing element edges and the crop material naturally results in some level of abrasive action which typically damages the crop material. As used herein, the term "damage" is meant to include splitting, cracking, nicking, scratching, and/or marring of the harvested crop materials.

As will be appreciated, damaged crop material is an inferior grade of product which quickly spoils and, therefore, only a relatively small percentage (typically 7-10%) is permitted by volume in those products intended for human consumption. Because only a relatively small percentage of damaged material is permitted in those products intended for human consumption such as corn, soybeans, kidney beans, peas and others, farmers are paid a premium price for crop materials having a relatively low damage content by volume at a collection station.

Reducing the operational speed of the rotor assembly has been proposed to limit crop material damage by the thresher elements of the combine. As will be appreciated, reducing the speed of the rotor assembly likewise reduces the overall capacity of the combine and, thus, detracts from productivity and, therefore, the profits the farmer may realize for the harvested crop material will be effected.

Another proposal to reduce damage to crop materials involves facing or plating the rasp-like configured threshing elements with chrome or other forms of metal. During combine operation, the threshing elements are subjected to considerable abrasive action by reason of dust and gritty materials brought into the threshing area from the field. Due to the speed of the rotor which must be maintained for efficient threshing, coupled with the abrasive material, rapid wear of the facing or plating on the threshing elements typically occurs. Unless new threshing elements are held in inventory, considerable down time of the combine is incurred. Adding new thresher elements to the rotor assembly is also expensive. Moreover, the damage to the grain is not readily perceivable by the farmer and, thus, he will not be able to tell if new parts are required until the harvested grain is graded at the collection point.

Thus, there remains a need and a desire for threshing elements which are designed to inhibit damage to crop materials impacting with and moving past the threshing elements thereby enhancing combine performance.

SUMMARY OF THE INVENTION

In view of the above, and in accordance with the present invention, there is provided a thresher element adapted for securement to a combine rotor for threshing crop materials and which reduces grain damage by about 10% to about 45% by volume as compared to combine rotors having rasp-like thresher element configurations. The thresher element of the present invention has a generally L-shaped configuration including a first portion adapted to extend from the combine rotor and a second portion which angles away from the first portion. The second portion of the thresher element is configured to impact with crop materials upon rotation of the rotor. In a preferred form of the invention, the first and second portions of the thresher element are each provided with a smooth outer material engaging surface extending thereover to substantially eliminate abrading action between the thresher element and crop materials adapted to be threshed thereby.

A plurality of thresher elements embodying features of the present invention are typically connected to the combine rotor and operate in combination with an elongated cylindrical housing in processing crop material introduced into a threshing area of the combine. Preferably, the rotor includes mounting means for supporting and connecting the threshing elements thereto. The first portion of each threshing element is configured to deflect crop material from engagement with the mounting means thereby inhibiting wear thereto and prolonging usefulness of the combine rotor. In a most preferred form of the invention, the first portion of the thresher elements is swept back relative to the direction of rotor rotation.

In one form of the invention, and to facilitate movement of crop material rearwardly through the threshing area, the threshing elements secured at a forward end of the rotor are configured to form helical arrays of thresher elements. Other thresher elements on the rotor are configured to form generally linear arrays of thresher elements extending rearwardly from the helical arrays. Each thresher element has a bottom surface extending along the length of the thresher element and configured to correspond to that portion of the outer surface of the rotor assembly to which the thresher element is affixed.

It has been found that a rotor assembly having alternative thresher element designs selectively arranged about the rotor is most efficient in harvesting rice, edible beans, and damp or wet crops. This modified thresher element design is similar to those designs discussed above except that the length of each thresher element is shortened and the side edges have different configurations. Unlike the generally parallel side edges used on thresher elements configured in helical or linear arrays, the modified thresher element design has its rearmost side edge disposed at an acute angle relative to the elongated axis of rotor rotation to facilitate crop advancement rearwardly through the threshing area.

In still another form of thresher element, which is typically used on a rotor assembly having shorter length thresher elements affixed thereto, a rib or spike extends outwardly from the smooth outer material engaging surface on the second portion of the thresher element. This modified design provides an excellent arrangement for tough harvesting conditions. For example, if the crop materials were to bunch together or mat, which is typical during handling wet crop, the thresher elements having a rib or spike thereon provide an aggressive moving action keeping the materials flowing and thereby preventing the creation of bunches or mats within the threshing area.

In a most preferred form of the invention, the smooth outer surface extending over the second portion of each thresher element has a generally curved cross-sectional profile extending over the entire outer surface thereof. The smooth outer surface enhances the rolling of crop material moving past the thresher element and provides a wedging action for the crop material moving therepast.

A salient feature of the present invention concerns the provision of a thresher element having a generally L-shaped configuration and a smooth outer material engaging surface which imparts substantially no abrading action to the crop material during the threshing process thereby enhancing combine performance. Substantial elimination of damage to the harvested crop warrants a higher price for the farmer at the collection station. Moreover, the configuration of the thresher element will not detract from the rotor assembly speed thus improving combine capacity without adversely effecting harvested grain quality.

Numerous other features and advantages of the present invention will become readily apparent from the following detailed description, the accompanying drawings, and the appended claims.

BRIEF DESCRIPTION OF THE DRAWINGS

FIG. 2 is a plan view of a threshing element embodying principles of the present invention;

FIG. 3 is a side sectional view taken along line 3—3 of FIG. 2;

FIG. 4 is a side sectional view taken along line 4—4 of FIG. 2;

FIG. 5 is a top plan view of another embodiment of a thresher element incorporating teachings of the present invention;

FIG. 6 is a side sectional view taken along line 6—6 of FIG. 5;

FIG. 7 is a side sectional view taken along line 7—7 of FIG. 5;

DETAILED DESCRIPTION OF PREFERRED EMBODIMENTS

Figure 1:
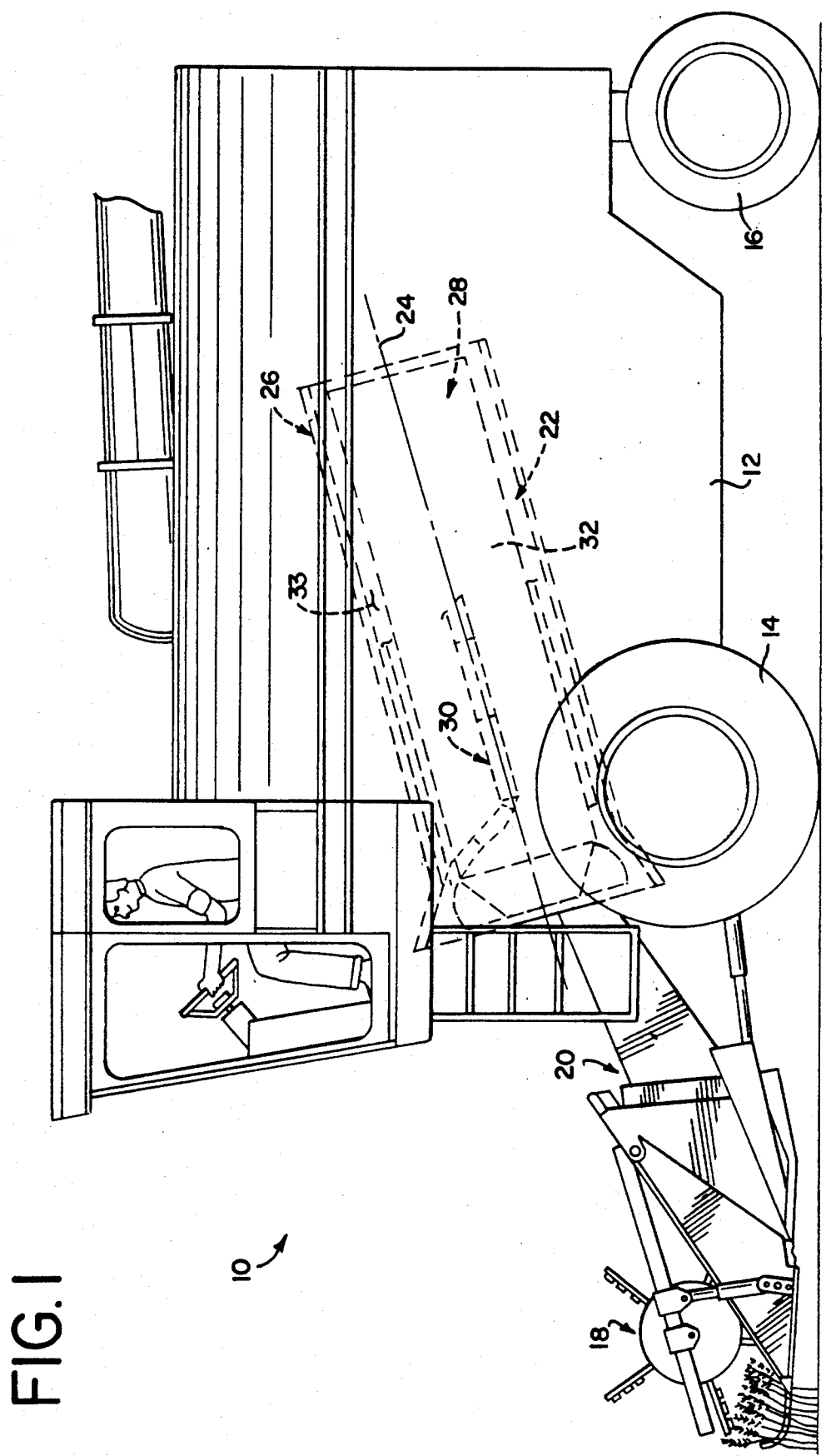
FIG. 1 is a diagrammatic view of an agricultural combine illustrating the general location of a rotor assembly therein.

While the present invention is susceptible of embodiment in various forms, there is shown in the drawings and will hereinafter be described, preferred embodiments of the invention with the understanding that the present disclosure is to be considered as setting forth exemplifications of the invention which are not intended to limit the invention to the specific embodiments illustrated.

Referring now to the drawings, wherein like reference numerals indicate like parts throughout the several views, there is shown a self-propelled combine 10 with a fore-and-aft extending frame 12 supported for movement over a field by front and rear pairs of wheels 14 and 16, respectively. At a forward end, combine 10 has a conventional head assembly 18 for severing and gathering crop materials, and a suitable feeder mechanism 20 for elevating and rearwardly advancing the crop materials toward a threshing area on the combine.

The threshing area of the combine is defined by a driven rotor assembly 22 mounted for rotation about an elongated axis 24 and within a stationary apertured cylinder housing 26. Housing 26 is provided with a conventional "concave and grate" configuration.

As illustrated, rotor assembly 22 is comprised of an elongated rotor 28 having a plurality of thresher elements 30 connected thereto and adapted to cooperate with housing 26 in threshing crop material harvested by the combine. In a preferred form of the invention, rotor 28 includes a generally cylindrical outer wall 32. Outer wall 32 of rotor 28 and an inner surface of housing 26 define a generally annular space 33 therebetween and through which crop material circulates and advances rearwardly toward an outlet end of the combine.

The thresher elements 30 are formed from a suitable metal or metal alloy and are connected about the rotor 28 in a specific arrangement. The thresher elements, as shown in FIG. 1, have either a generally helical or linear configuration. The thresher elements having a generally helical configuration are affixed to a forward end of the rotor 28 to form helical arrays of thresher elements to rearwardly advance crop material through the threshing area. The thresher elements having a generally linear configuration are fixed about the rotor to form generally linear arrays of thresher elements. In the illustrated embodiment, the linear arrays of thresher elements correspond in number to and extend rearwardly from the helical arrays of thresher elements.

An example of a thresher element having a generally linear configuration is illustrated in FIGS. 2 through 4. Each thresher element includes first and second portions 34 and 36, respectively, which are configured in a general L-shape. Preferably, the first and second portions 34 and 36, respectively, of the thresher element are integrally formed with each other during a manufacturing process.

In the illustrated embodiment, the first portion 34 extends away from the rotor 28. The second portion 36 of the thresher element angles away from the first portion 34 and extends about the combine rotor to impact with crop materials. As shown in FIG. 2, the length of the thresher elements is defined by a distance separating opposite and generally parallel side edges 38 and 40 of each thresher element.

Each thresher element further includes a bottom surface 42 extending along the length of the thresher element. The bottom surface 42 is configured to correspond to the outer surface configuration of the rotor 28 whereat the thresher element is affixed.

A salient feature of this invention is that the first and second portions 34 and 36, respectively, of the thresher element each have a smooth outer material engaging surface 44 extending thereabout and between the opposite side edges 38 and 40 of the thresher element. In a most preferred form of the invention, the smooth outer material engaging surface 44 extending over and along the second portion 36 of the thresher element has a generally convex and preferably curved cross-sectional profile extending over the entirety thereof.

In the preferred form of the invention, the outer material engaging surface 44 is contiguous to both portions 34 and 36 of the thresher element. The term "smooth outer material engaging surface" as used herein as meant to define a continuous generally even surface having no rasp-like edges which tend to impart an abrading action to the crop materials during the threshing process.

Figure 9:
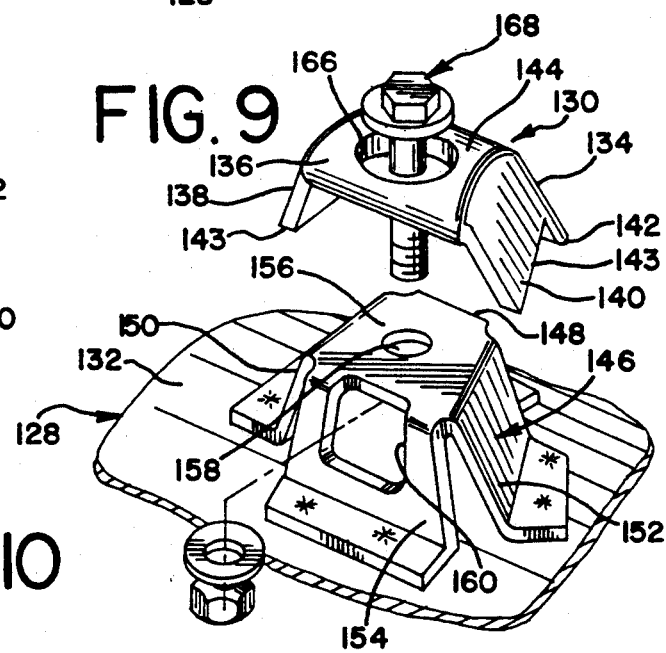
FIG. 9 is an exploded, fragmentary, perspective view of a mounting lug and alternative embodiment of a thresher element.

The thresher elements can be affixed to the rotor through any suitable means. In a preferred form of the invention, however, rotor 28 further includes mounting means for releasably supporting and connecting the thresher elements 30 to the rotor. As shown in FIG. 9, the thresher element mounting means for the linear threshing elements includes a mounting member 46 which is suitably affixed, preferably as by welding, to an outer wall 32 of the rotor 28. As shown, an inner surface 48 of the thresher elements and the outer form of the apertured mounting member 46 are complimentary to each other.

The first portion 34 of the threshing element, including the smooth outer surface 44 provided thereon, is configured to deflect crop material from engagement with the mounting means 46. As shown in FIG. 4, the first portion 34 of the thresher element including the smooth outer surface 44 provided thereon extends away from the outer wall 32 of rotor 28 at a swept back angle relative to the direction of rotor rotation indicated by arrow 54.

The second portion 36 of the thresher element, shown in FIGS. 2 and 4, has a length and width of sufficient size to define at least two generally aligned connector receiving openings 50 between the opposite side edges 38 and 40 thereof. The rotor assembly further includes suitable connector means 52 which pass through the openings 50 and cooperate with the mounting member 46 for securing the thresher element thereto. As shown, connector means 52 is comprised of conventional bolts, washers, and nuts.

Notably, the connector receiving openings 50 are configured to allow the connector means 52 to be recessed from and thereby maintain the uniform outer material engaging surface 44 on the respective thresher element. As will be appreciated, maintaining a uniform profile along the entirety of the thresher element outer surface inhibits damage to the crop material by allowing no abrading action to be imparted to the crop materials moving therepast.

FIGS. 5 through 7 illustrate another embodiment of a thresher element. The thresher element illustrated in FIGS. 5 through 7 has similar structure and operation to the linear thresher elements described above but has a generally helical configuration between opposite and generally parallel side surfaces 38' and 40'. The helical configuration of the thresher element illustrated in FIGS. 5 through 7 functions to rearwardly advance crop material through the threshing area of the combine.

As shown in FIGS. 6 and 7, the mounting means for the helically shaped threshing elements includes helically-shaped mounting members 46' suitably affixed to the outer wall of the rotor 28. In a manner similar to that described above, suitable connector means 52' releasably affix the helical thresher elements to the outer wall 32 of the rotor 28. Notably, the connector means 52' are recessed from the smooth outer face 44' of the helical thresher elements thereby minimizing abrading action with the crop materials moving therepast and thereby inhibiting damage to the crop material during the threshing process.

As with the linear threshing elements, the smooth outer surface 44' extending over the second portion of the helical thresher elements has a generally curved cross-sectional profile extending over the entirety thereof. Moreover, the helical thresher elements each include a bottom surface 42' which extends along the length of the thresher element and compliments the outer wall surface configuration on the rotor 28 in that area to which the helical thresher elements are attached.

Figure 8:
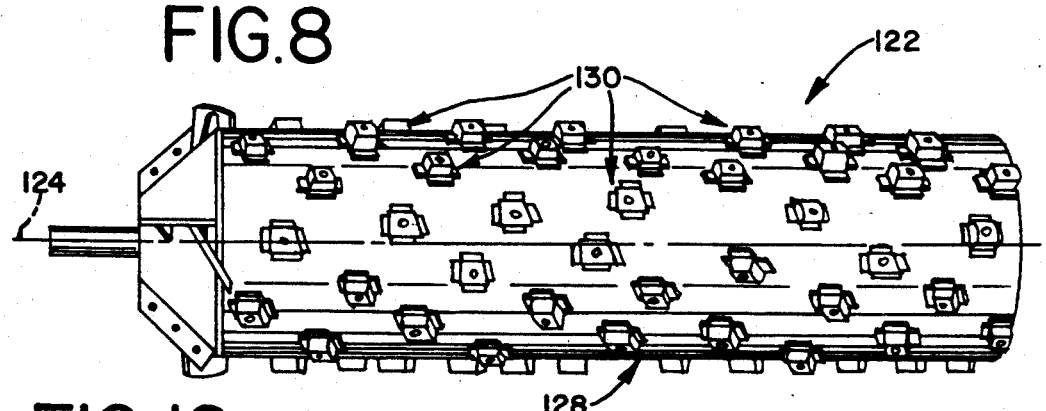
FIG. 8 is an alternative embodiment of a rotor assembly having another embodiment of threshing element secured thereabout.

Another embodiment of a rotor assembly 122 for a combine is schematically illustrated in FIG. 8. Rotor assembly 122 is mounted for rotation about an elongated axis 124 and is adapted to cooperate with a housing (not shown) similar to the foraminous housing 26. Rotor assembly 122 comprises an elongated rotor 128 having a plurality of thresher elements 130 connected thereto for threshing crop materials. The thresher elements 130 are adapted for selective connection about the outer wall 132 and along the length of the rotor 128 to form desired orientations of thresher elements about the circumference of the rotor.

Figure 10:
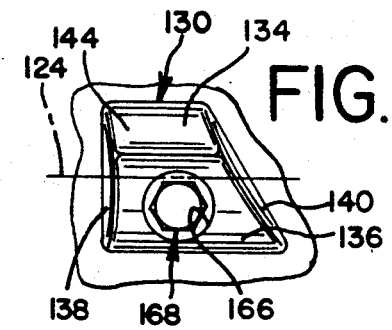
FIG. 10 is a top plan view of the thresher element embodiment illustrated in FIG. 9.

As shown in FIGS. 9 and 10, each thresher element 130 is formed from a suitable metal or metal alloy and includes first and second portions 134 and 136 which combine to form a generally L-shaped configuration. The first and second portions 134 and 136, respectively, of the thresher element 130 are preferably integrally formed with each other during a manufacturing process. When mounted to the rotor 128, the first portion 134 extends away from the rotor 128 and the second portion extends thereabout to impact with the crop material during the threshing process.

Each thresher element 130 further includes side walls 138 and 140. Side walls 138 and 140 depend from the second portion 136 of the thresher element 130. Preferably, the side walls 138 and 140 are likewise joined to the first portion 134 of the thresher element to form a structure which opens toward a rear side thereof for purposes to be described in detail hereinafter.

As illustrated in FIG. 9, the first portion of each thresher element 130 further includes a bottom surface 142 which is configured to correspond to the surface on the outer wall 132 of the rotor to which the thresher element is secured. As shown, each side wall 138 and 140 of the thresher element is likewise provided with a bottom surface 143 which is spaced a relatively short vertical distance from the bottom surface 142.

As best shown in FIG. 10, the trailing side wall 140 of each thresher element 130 is rearwardly slanted relative to the elongated axis 124 of the rotor 128. The slanted wall 140 facilitates rearward crop material advancement during the threshing process.

As in the other thresher element embodiments, the first and second portions 134 and 136, respectively, of the threshing elements 130 each include a smooth outer material engaging surface 144 extending along and thereabout. The smooth outer material engaging surface 144 on the thresher elements 130 is provided to allow the thresher elements to impact with the crop material while inhibiting damage thereto during the threshing process.

Rotor 128 further includes a plurality of mounting means for releasably supporting and connecting the thresher elements 130 thereon in a desired pattern to promote the threshing process. In this embodiment of the invention, and as shown in FIG. 9, the thresher element mounting means includes a mounting member 146 which is secured, as by welding, to the cylindrical outer wall 132 of the rotor 128.

Figure 12:
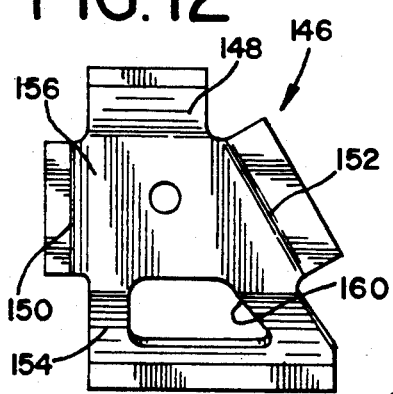
FIG. 12 is a top plan view of one form of a thresher element mounting member.

As shown in FIGS. 9 and 12, each mounting member 146 is an open structure including a front or leading wall 148, side walls 150 and 152, and a rear or trailing wall 154. Walls 148 through 154 are joined to each other by a top wall 156. Top wall 156 is provided with a connector-receiving aperture 158 while the rear wall 154 is provided with an access opening 160 sized to permit entry into the interior of the mounting member 146 with a suitable tool for purposes which will become apparent as the description proceeds. As will be appreciated, other suitable mounting means may be used to facilitate securement of the thresher elements 130 the rotor 128 without detracting or departing from the spirit and scope of the present invention.

Figure 11:
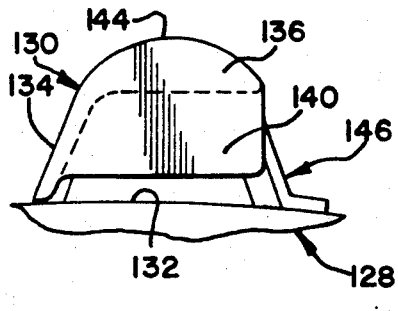
FIG. 11 is a left side view of the thresher element illustrated if FIG. 10.

The first portion 134, including its smooth outer surface 144, is configured to deflect crop material from engagement with the respective mounting member 146 during the threshing process. In this regard, the first portion of each threshing element 130, including the smooth outer material engaging surface 144 thereon, is arranged at a swept back angle relative to the direction of rotor rotation indicated in FIG. 11 by arrow 164. Side walls 138 and 140 likewise inhibit crop materials from impacting against the respective mounting member 146 during the threshing process.

To promote selective arrangement of the thresher elements about the periphery of the rotor assembly, releasable connector means individually affix the threshing elements 130 to the outer wall of the rotor 128. Notably, the second portion 136 of each thresher element 130 is sized to define sufficient area for at least one connector receiving opening 166. A suitable connector assembly 168 preferably comprised of a bolt, washers, and nut releasably and independently secure the thresher element 130 to a respective mounting member 146 on the rotor 128.

As will be appreciated, the opening to the rear side of the thresher element 130 when combined with the opening 160 on the mounting member 146 provides tool access to the connector assembly 168 for connecting or removing of a respective threshing element to the rotor 128. As in the first embodiment, connector- the receiving opening 166 is configured to maintain all portions of the connector assembly 168 in recessed relation from the smooth outer material engaging surface 144 of the thresher element thereby inhibiting damage to crop material moving therepast.

Figure 13:
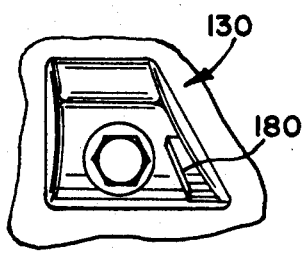
FIG. 13 is a top plan view of another embodiment of a thresher element embodying features of the present invention.
Figure 14:
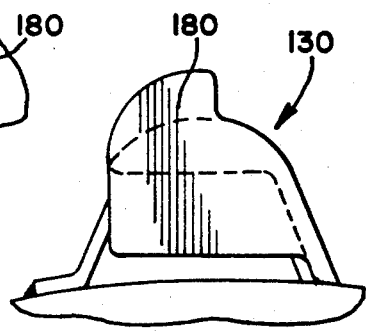
FIG. 14 is a right side view of the thresher element illustrated in FIG. 13.

FIGS. 13 and 14 illustrate a thresher element of similar configuration and operation to the thresher elements 130 but having an additional spike or rib 180 projecting upwardly from the smooth material engaging surface 144 provided on the second portion 136 of each thresher element. The spiked configuration 180 on the thresher element will add an aggressive feeding feature to the threshing element 130.

During combine operation, crop material is introduced between the rotor assembly and the cylindrical housing. The threshing elements, regardless of their configuration, are adapted to impact with and thereby process the crop material as it circulates about the rotor assembly. The smooth outer material engaging surface provided on each of the thresher elements of the present invention substantially eliminates any abrading action between the crop material and the thresher elements during threshing process. Thus, damage in the form of nicking, marring, scratching and etc., of the crop materials is minimized.

Configuring the outer material engaging surface of the thresher elements with a smooth surface, improves the quality of crop material threshed by the combine. In comparison to the thresher elements having rasp-like configurations on the outer surface thereof, about a 10% to about a 45% reduction in crop material damage is realized with a rotor assembly including thresher elements having a smooth outer material engaging surface. The reduction in damage to crop materials results in an improved quality of crop harvested by the combine thus providing the farmer a premium price for his product at the collection center.

Besides having a smooth outer material engaging surface, the generally L-shaped configuration of the threshing elements promotes beneficial threshing performance during the combine operation. The first portion of each thresher element extends outwardly from the rotor and protects the threshing element mounting means from impacting with the crop materials during the threshing process. Because the thresher element mounting means are fixedly attached to the outer wall of the rotor, severe damage thereto from crop materials impacting thereagainst would ultimately mandate replacement of the rotor. Prolonging the usefulness of the thresher element mounting means, therefore, provides a distinct advantage and reduces the downtime which would ultimately be incurred during repair and/or replacement of the thresher element mounting means or the entire rotor. The swept back angular configuration of the first portion of each thresher element furthermore promotes appropriate crop material movement during the threshing process.

The second portion of each threshing element extends about the rotor and impacts with the crop materials during the threshing process. Notably, the smooth outer surface extending over the second portion of the thresher element has a curvilinear configuration. As will be appreciated, a line drawn tangent to the curved configuration extending over the second portion of each thresher element forms an acute angle or wedge relative to the direction of rotor rotation. The acute angle is indicative of the influence that the second portion of the thresher element has on the crop materials during the threshing process. It has been found that a relative shallow attack angle or wedge formation between the outer material engaging surface on the second portion of the thresher element and the direction of rotor rotation is preferable during the threshing process to further minimalize damage to the crop materials. Moreover, the curvilinear profile on the outer material engaging surface of the second portion of the thresher elements enhances the rolling of crop materials therepast.

It will be appreciated that the teachings of the present invention equally apply to varied and different forms of combine rotor assemblies. The rotor design schematically illustrated in the drawings offers an advantage in that it allows the crop material to gently spiral toward the discharge end of the combine during the threshing process. Moreover, the ability to vary the thresher element disbursement in almost a limitless variety of patterns about the rotor further facilitates the threshing operation and allows the operator to adapt the combine rotor to the particular crop conditions being harvested.

If a wet and/or grassy crop material is being harvested, there is the possibility that the crop material will bunch or form a continuous mat which is detrimental to combine operation and efficiency. To overcome the problem of the crop material forming a bunch or mat during rotor rotation, a thresher element having a smooth outer surface on both the first and second portions and a upstruck rib or spike is provided on the thresher element to enhance the flow of material and obtain a more aggressive threshing action.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A rotor assembly for an agricultural combine, comprising:
    a rotor having an elongated axis of rotation; and
    a series of thresher elements connected to said rotor for threshing crop materials harvested by said combine, each thresher element including first and second portions, with said second portion being configured to angle away from said first portion and extends about the combine rotor to impact with crop materials, and wherein said first and second portions of each thresher element have a length and width defining a material engaging area extending therebetween, and wherein the entirety of each material engaging area has a continuous and smooth outer surface configuration whereby substantially no abrading action is imparted to the crop material by the thresher element means during threshing thereby inhibiting damage to the crop material.

2. The rotor assembly according to claim 1 wherein said rotor further includes mounting means for supporting and connecting said thresher elements to said rotor.

3. The rotor assembly according to claim 2 wherein the first portion of each thresher element has a length sufficient to protect and is angularly configured relative to said second portion of the thresher element to deflect crop material from engagement with said mounting means.

4. The rotor assembly according to claim 1 wherein adjacent thresher elements secured to a forward end of said rotor area arranged in a helical formation to facilitate movement of crop material rearwardly relative to said rotor.

5. The rotor assembly according to claim 1 wherein the length of the second portion of each thresher element is sufficient to define at least one connector receiving opening between opposite side edges thereof and has a generally convex cross-sectional profile extending across the entire outer surface configuration thereof to enhance rolling of crop material past the thresher element.

6. The rotor assembly according to claim 1 wherein each thresher element includes opposite side edges extending generally parallel relative to each other.

7. The rotor assembly according to claim 1 wherein said thresher elements further include side edges, with one side edge being disposed at an acute angle relative to the elongated axis of rotation of the rotor to facilitate crop advancement.

8. The rotor assembly according to claim 1 wherein at least one of said thresher elements has opposite side edges and further includes an upstanding rib extending away from the smooth and continuous outer material engaging surface on said second portion of the thresher element adjacent one side edge thereof.

9. The rotor assembly according to claim 1 further including thresher element mounting means on said rotor, and connector means for securing said threshing elements to said mounting means.

10. A rotor assembly mounted for rotation within an elongated cylindrical housing in a fore-and-aft relation and secured to a frame of an agricultural combine, said housing having an apertured portion which acts in combination with said rotor assembly to thresh and process crop material, said rotor assembly comprising:
    a driven rotor having a generally cylindrical outer wall, the outer wall of said rotor and an inner surface of said housing defining a generally annular space therebetween and through which crop material circulates and advances rearwardly toward an outlet end of the combine; and
    a plurality of thresher elements affixed to the outer wall along the length of said rotor, each thresher element projecting into the annular space to impact with and thresh crop materials advancing therethrough, and with each thresher element having fist and second portions, the first portion of each thresher element extending away from the outer wall of the rotor at a swept back angle relative to the direction of rotor rotation, the second portion of the thresher elements extending away from said first portion and about the outer wall of said rotor, the second portion of each thresher element having a material engaging outer area defined by length and width boundaries of the second portion of each thresher element, and wherein the entire outer area of the second portion of the thresher elements being provided with a continuous and smooth surface configuration such that the threshing elements impart substantially no abrading action to the crop materials during the threshing process.

11. The rotor assembly according to claim 10 further including mounting means arranged about the rotor for affixing said thresher elements thereto, said mounting means being arranged such that the thresher elements affixed to a forward end of said rotor form helical arrays of thresher elements to rearwardly advance crop materials while other thresher elements form general linear arrays of thresher elements extending rearwardly from the helical arrays.

12. The rotor assembly according to claim 11 wherein each thresher element in the arrays has a bottom surface extending along the length of the thresher element and configured to correspond to an outer surface of the rotor assembly to which the thresher elements are affixed.

13. The rotor assembly according to claim 10 wherein each thresher element includes at least two connector receiving openings provided on said second portion thereof to facilitate affixing the thresher elements to the outer wall of the rotor.

14. The rotor assembly according to claim 10 further including mounting means arranged about the rotor for affixing said thresher elements thereto, and wherein each thresher element includes at least one connector-receiving opening for facilitating selective and releasable securement of the thresher elements to said mounting means to form desired orientations of thresher elements about the circumference of the rotor.

15. The rotor assembly according to claim 10 wherein each thresher element has fore-and-aft side surfaces, with at least one of the side surfaces being configured to impart a rearward advancing motion to the crop material.

16. The rotor assembly according to claim 10 wherein the continuous and smooth outer surface configuration on said second portion of said thresher elements has a generally curved cross-sectional profile which blends with a continuous surface on said first portion of the respective element and defines a relatively shallow attack angle with the crop material when said rotor is driven.

17. A thresher element adapted for securement to a combine rotor for threshing crop materials, said thresher element having a generally L-shaped cross-sectional configuration including a first portion adapted to extend from the combine rotor and a second portion which angles away from said first portion, said second portion of said thresher element being configured to extend about the combine rotor to impact with crop materials, and wherein said first and second portions of said thresher element each has a length and width defining a material engaging area extending therebetween, and wherein the entirety of each material engaging area has a continuous and smooth outer surface configuration extending thereover to substantially eliminate abrading action between the thresher element and crop materials adapted to be threshed thereby.

18. The thresher element according to claim 17 wherein the length of each thresher element is defined between opposite sides which extend generally parallel relative to each other.

19. The thresher element according to claim 17 wherein each thresher element length is defined between opposite sides of the thresher element, with at least one of said side edges being offset at an angle relative to the opposite side to facilitate crop advancement.

20. The thresher element according to claim 17 wherein the continuous and smooth configuration extending over the outer material engaging surface area of the second portion has a generally curved cross-sectional profile extending over the entirety thereof.

21. The thresher element according to claim 17 wherein side edges are joined to and define the length of said second portion and an upstanding rib extends away from the smooth and continuous outer material engaging surface area of said second portion adjacent one side edge.

22. In an agricultural combine comprising mobile frame, means for severing and harvesting crop material as the combine is moved across a field, means for advancing severed crop material toward a threshing area on the combine frame defined by a foraminous cylindrical housing with a driven assembly rotatably mounted within the housing for threshing crop materials received in the threshing area from the advancing means, said driven assembly comprising a plurality of threshing elements disposed about a common axis to impact with an thresh crop materials in the threshing area, with each threshing element having a generally L-shaped cross-sectional configuration defined by first and second portions, the second portion of the thresher element angularly extending from the first portion, and with the first and second portions of each thresher element each having a length and width defining a material engaging area extending therebetween, and wherein the entirety of the material engaging area on at least the second portion of each thresher element has a continuous and generally even outer surface extending over the entirety thereof whereby damage to the crop materials attributable to an abrasive action between the thresher element and the crop material is substantially eliminated thereby improving the quality of materials threshed by the combine.

* * * * *